United States Patent
Zhang et al.

(10) Patent No.: US 9,470,150 B2
(45) Date of Patent: Oct. 18, 2016

(54) GAS TURBINE POWER AUGMENTATION SYSTEM

(71) Applicant: General Electric Company, Schenectady, NY (US)

(72) Inventors: Jianmin Zhang, Greer, SC (US); Tailai Hu, Lake Wylie, SC (US); Bradly Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 759 days.

(21) Appl. No.: 13/873,267

(22) Filed: Apr. 30, 2013

(65) Prior Publication Data

US 2014/0321967 A1 Oct. 30, 2014

(51) Int. Cl.
 *F02C 7/143* (2006.01)
 *F02C 7/047* (2006.01)
 *F02C 7/08* (2006.01)

(52) U.S. Cl.
 CPC ............ *F02C 7/143* (2013.01); *F02C 7/047* (2013.01); *F02C 7/08* (2013.01)

(58) Field of Classification Search
 CPC .......... F02C 7/047; F02C 7/143; F02C 7/18
 USPC ............................... 244/53 B; 137/15.1, 15.2
 See application file for complete search history.

(56) References Cited

U.S. PATENT DOCUMENTS

| | | | | |
|---|---|---|---|---|
| 5,414,992 A * | 5/1995 | Glickstein | ............ | B64D 13/006 60/39.83 |
| 5,626,468 A * | 5/1997 | Muir | ..................... | F04B 35/002 248/639 |
| 6,027,304 A * | 2/2000 | Arar | ........................ | F02C 7/045 415/116 |
| 6,250,064 B1 * | 6/2001 | Tomlinson | ............ | F01K 21/047 60/775 |
| 6,530,224 B1 | 3/2003 | Conchieri | | |
| 2004/0001751 A1 | 1/2004 | Poccia et al. | | |
| 2010/0175388 A1 * | 7/2010 | Tillery | ..................... | F01D 25/10 60/785 |
| 2010/0319384 A1 | 12/2010 | Zhang et al. | | |
| 2011/0162383 A1 | 7/2011 | Zhang et al. | | |
| 2011/0173947 A1 | 7/2011 | Zhang et al. | | |
| 2013/0000321 A1 * | 1/2013 | Arar | ........................ | F02C 6/08 60/785 |

OTHER PUBLICATIONS

U.S. Appl. No. 13/236,712, filed Sep. 20, 2011, Zhang, et al.
U.S. Appl. No. 13/669,478, filed Nov. 6, 2012, Hao, et al.

* cited by examiner

*Primary Examiner* — Craig Kim
*Assistant Examiner* — Brian O Peters
(74) *Attorney, Agent, or Firm* — Sutherland Asbill & Brennan LLP

(57) ABSTRACT

The present application provides a power augmentation system for use with a gas turbine engine. The power augmentation system may include a compressor discharge manifold, an inlet bleed heat system in communication with the compressor discharge manifold via an inlet bleed heat line, and an auxiliary compressor in communication with the compressor discharge manifold via the inlet bleed heat line.

20 Claims, 2 Drawing Sheets

GAS TURBINE POWER AUGMENTATION SYSTEM

TECHNICAL FIELD

The present application and the resultant patent relate generally to gas turbine engines and more particularly relate to a gas turbine engine with a power augmentation system using an auxiliary air compressor for boosting output power during hot ambient conditions.

BACKGROUND OF THE INVENTION

Overall gas turbine power output may decrease with increasing ambient inlet airflow temperatures. As such, one method of increasing the power output of a gas turbine is by cooling the inlet air before compressing it in the compressor. Such inlet cooling causes the air to have a higher density so as to create a higher mass flow rate in the compressor. The higher mass flow rate of the air in the compressor allows more air to be compressed so as to allow the gas turbine engine to produce more power.

Known methods of cooling include latent or evaporative cooling, wet compression, supercharged inlet air, high pressure steam injection, and the like. These known methods, however, may involve limitations to gas power augmentation. For example, evaporative cooling may not work effectively in a hot and wet environment and typically consumes a significant amount of water. Wet compression may result in compressor blade abrasion. Supercharge air may require a complicated inlet system and may be a parasitic drain on the overall operation of the gas turbine engine.

There is therefore a desire for an improved power augmentation system for use with a gas turbine engine. Preferably, such a power augmentation system may improve overall gas turbine power output, particularly during hot ambient conditions, with reduced costs and a reduced impact on existing gas turbine components and operations.

SUMMARY OF THE INVENTION

The present application and the resultant patent thus provide a power augmentation system for use with a gas turbine engine. The power augmentation system may include a compressor discharge manifold, an inlet bleed heat system in communication with the compressor discharge manifold via an inlet bleed heat line, and an auxiliary compressor in communication with the compressor discharge manifold via the inlet bleed heat line.

The present application and the resultant patent further provide a method of augmenting power in a gas turbine engine under varying ambient conditions. The method may include the steps of placing an auxiliary compressor in a communication with a compressor discharge manifold via an inlet bleed heat system, flowing the auxiliary compressed air from the auxiliary compressor to the compressor discharge manifold under hot ambient conditions or when power augmentation is desired, and flowing hot compressed air from the compressor discharge manifold to the inlet bleed heat system under cold ambient conditions or when inlet bled heat is desired.

The present application and the resultant patent further provide a power augmentation system for use with a gas turbine engine. The power augmentation system may include a compressor discharge manifold for discharging a flow of hot compressed air, an inlet bleed heat system in communication with the compressor discharge manifold via an inlet bleed heat line, an auxiliary compressor for discharging a flow of auxiliary compressed air, the auxiliary compressor in communication with the compressor discharge manifold via the inlet bleed heat line, and a compressed air injection valve on the inlet bleed heat line.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
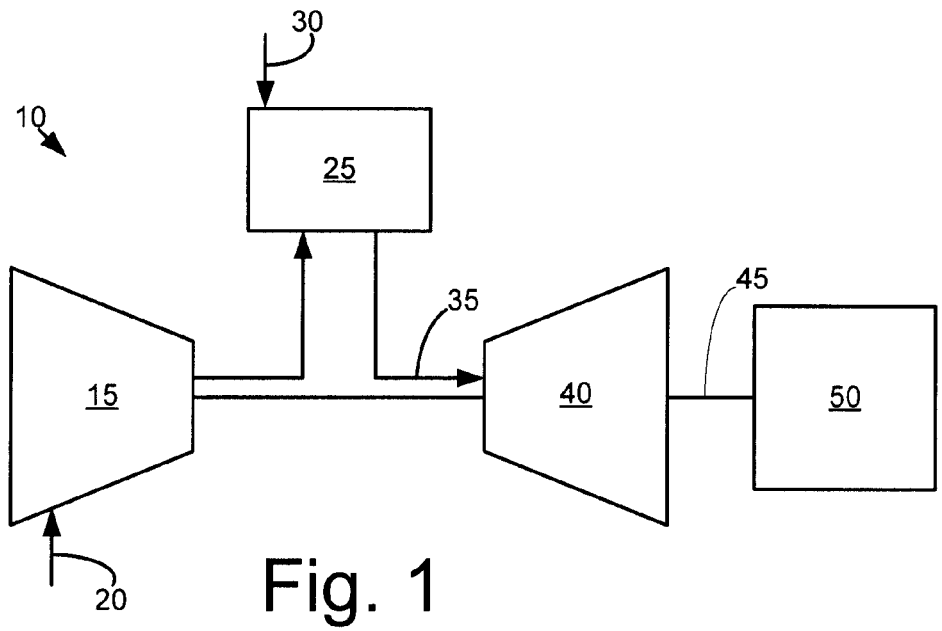
FIG. 1 is a schematic diagram of a gas turbine engine with a compressor, a combustor, a turbine, and a load.
Figure 2:
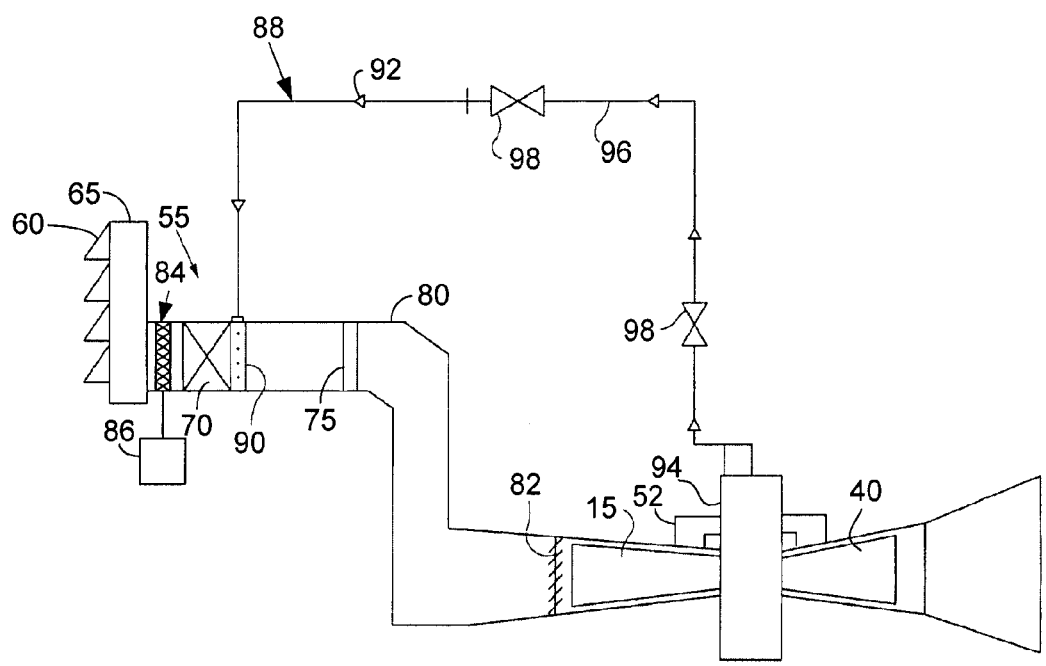
FIG. 2 is a schematic diagram of a gas turbine engine with an inlet air system.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. One or more air extractions 52 may extend from the compressor 15 to the turbine 40 for a flow of cooling air The gas turbine engine 10 may use natural gas, various types of syngas, various types of liquid fuels, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 may operate with an inlet air system 55. The inlet air system 55 may include a weather hood 60 mounted on an inlet filter house 65 for the incoming flow of air 20 to pass therethrough. The weather hood 60 may prevent weather elements such as rain, snow, and the like from entering therein. A silencer section 70 and one or more screens 75 also may be used herein and may be positioned within an inlet air plenum 80. The flow of air 20 thus may pass through the weather hood 60, the inlet air plenum 80, and into the compressor 15 for compression and combustion as described above. A number of inlet guide vanes 82 also may be positioned about the intake of the compressor 15 to direct the flow of air 20 into the compressor 15 at the intended angle.

The inlet air system 55 also may include a water cooling system 84. The water cooling system 84 may be a latent or an evaporative cooling system, a wet compression system, or any type of conventional cooling system for cooling the incoming flow of air 20. The water cooling system 84 may be positioned anywhere along the inlet air system 55. The water cooling system 84 may be in communication with a water skid 86 or other type of water source. As described above, the water cooling system 84 generally may be used during hot ambient conditions.

The inlet air system 55 also may include an inlet bleed heat system 88. The inlet bleed heat system 88 may include a number of heater tubes or pipes 90 positioned about the inlet air plenum 80 or elsewhere. The inlet bleed heat system 88 may provide a flow of hot compressed air 92 from a compressor discharge manifold 94 of the compressor 15 via one or more inlet bleed heat lines 96. One or more control valves 98 may be used herein to control the flow of the hot compressed air 92. The inlet bleed heat system 88 generally may be used during cold ambient conditions. Other sources of the hot compressed air 92 also may be used herein. Other components and other configurations may be used herein.

Figure 3:
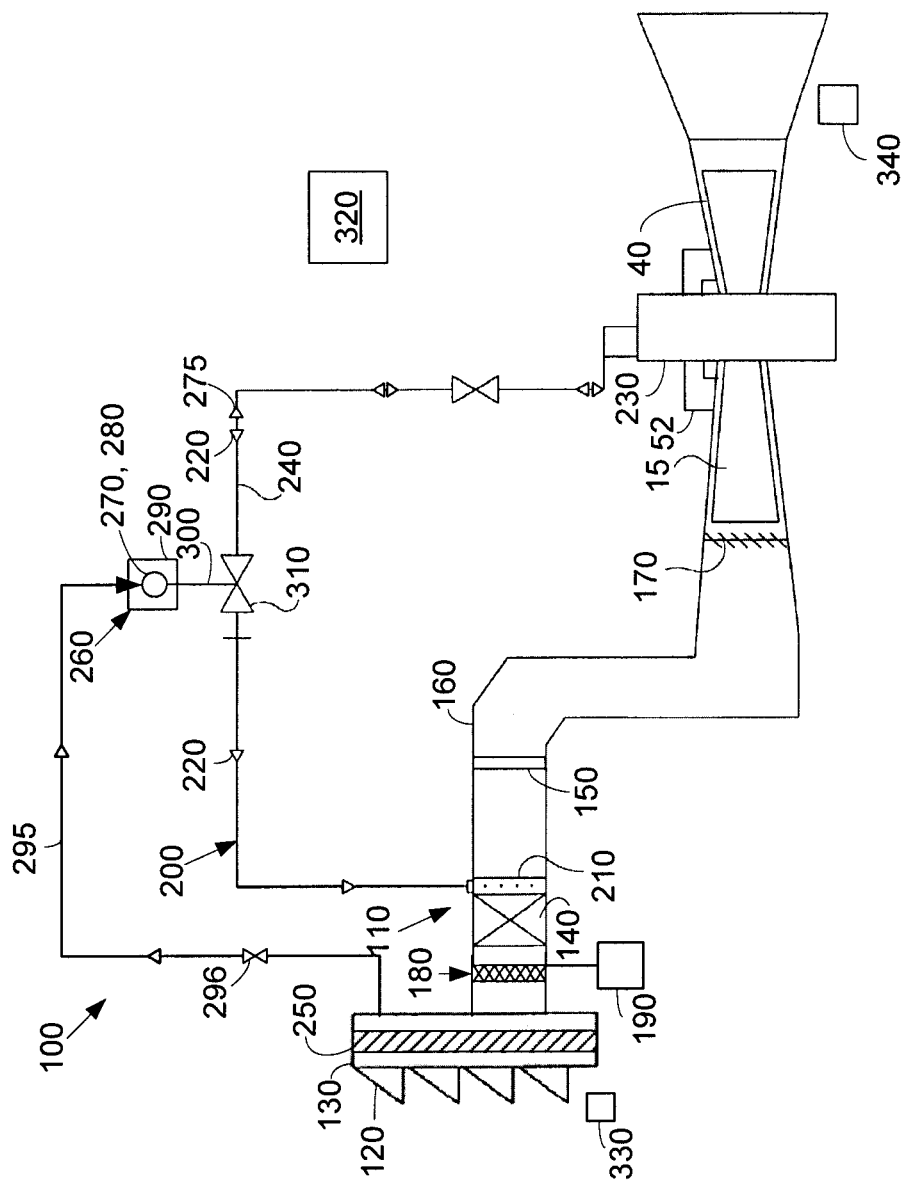
FIG. 3 is a schematic diagram of a gas turbine engine with a power augmentation system as may be described herein.

FIG. 3 shows a power augmentation system 100 as may be described herein. The power augmentation system 100 may be used with the gas turbine engine 10 such as that described above. The power augmentation system 100 may include an inlet air system 110 in communication with the gas turbine engine 10. The inlet air system 100 may be similar to that described above. For example, the inlet air system 110 may include a weather hood 120 mounted within an inlet filter house 130 that may be enlarged. In this example, the inlet filter house 130 may be oversized so as to increase the flow of air 20 therethrough. The inlet air system 110 also may include a silencer section 140 and one or more screens 150 positioned within an inlet air plenum 160 in communication with the compressor 15. A number of inlet guide vanes 170 also may be used. Other components and other configurations may be used herein.

The power augmentation system 100 also may include a number of additional filters 250. The additional filters 250 may be positioned about the enlarged inlet filter house 130 or elsewhere along the inlet air plenum 160 of the inlet air system 110. The additional filters 250 may provide dedicated filtration capacity for air flow boosting given the enlarged inlet filter house 130. The additional filters 250 may be of conventional design. The additional filters 250 may be located in a separate module or housing. Other components and other configurations also may be used herein.

The inlet air system 100 also may include a water cooling system 180. The water cooling system 180 may be in communication with a water skid 190 or other type of water source. The water cooling system 180 may be a latent or an evaporative cooling system, a wet compression system, or any type of conventional cooling system for cooling the incoming flow of air 20. The water cooling system 180 may be positioned anywhere along the inlet air system 110.

The inlet air system 110 also may include an inlet bleed heat system 200. The inlet bleed heat system 200 may include a number of heater tubes 210 positioned about the inlet air plenum 160 or elsewhere. The inlet bleed heat system 200 may receive a flow of hot compressed air 220 from a compressor discharge manifold 230 or other source via one or more inlet bleed heat lines 240. Other components and other configurations may be used herein.

The power augmentation system 100 also may include a compressed air injection system 260. The compressed air injection system 260 may include an auxiliary compressor 270. The auxiliary compressor 270 may be a supercharging compressor 280 of conventional design. The auxiliary compressor 270 creates a flow of auxiliary compressed air 275. Other types of compressors or other sources of compressed air may be used herein. The auxiliary compressor 270 may be positioned about an auxiliary compressor skid 290 adjacent to the gas turbine engine 10 or elsewhere. The auxiliary compressor 270 may have any suitable volume and capacity. More than one auxiliary compressor 270 may be used herein. Other components and other configurations also may be used herein.

The auxiliary compressor 270 of the compressed air injection system 260 may be in communication with the incoming air flow 20 from the enlarged inlet filter house 130 via one or more auxiliary compressor lines 295. One or more auxiliary compressor line valves 296 may be positioned thereon. Other sources of air 20 also may be used herein.

The compressed air injection system 260 may be in communication with the compressor discharge manifold 230 via the inlet bleed heat lines 240 of the inlet bleed heat system 200. A compressed air line 300 may meet the inlet bleed heat line 240 at a compressed air injection valve 310. The compressed air injection valve 310 allows either the flow of the auxiliary compressed air 275 from the compressed air injection system 260 to flow to the compressor discharge manifold 230 or the compressed air injection valve 310 allows the hot compressed air 220 to flow from the compressor discharge manifold 230 in the opposite direction to the inlet bleed heat system 200 as described above. Other components and other configurations may be used herein.

Operation of the gas turbine engine 10 and the power augmentation system 100 may be controlled by a controller 320. The controller 320 may be any type of programmable logic device with various types of control algorithms and/or other types of software so as to operate and regulate the components herein. Multiple controllers 320 may be used. The controller 320 may be in communication with a number of sensors so as to receive ambient parameters, operational parameters, and the like. For example, a temperature sensor 330 may be positioned about the inlet air system 110. Likewise, a load sensor 340 may be positioned about the turbine 40. Many different types of parameters may be sensed and accommodated herein. The controller 320 also may operate the valves 296, 310 and the like. Other components and other configurations also may be used herein.

In use, the power augmentation system 100 may be in communication with the gas turbine engine 10 via the inlet air system 110. Based upon input from the temperature sensor 330, the load sensor 340, and/or other types of sensors, the controller 320 may activate the power augmentation system 100 under hot ambient conditions and/or other conditions. Specifically, the auxiliary compressor line valve 296 and the compressed air injection valve 310 may be opened so as to allow a portion of the flow of air 20 to flow to the auxiliary compressor 270 and the flow of auxiliary compressed air 275 to flow through the inlet bleed heat lines 240 to the compressor discharge manifold 230. As the auxiliary compressed air 275 from the compressed air injection system 260 flows to the combustor 25, the back pressure within the compressor 15 is increased so as to increase the total mass airflow to the combustor 25. The higher mass airflow allows the combustor 25 to burn more fuel 30 for a higher power output while maintaining a relatively stable firing temperature at the entrance to the turbine 40.

The auxiliary compressed air 275 also may be injected upstream into the compressor 15 via the extraction lines 52 or elsewhere. The compressed air injection system 260 may be used with or without the water cooling system 180. The use of the water cooling system 180 could add to the overall power augmentation herein. Other components and other configurations may be used herein.

Alternatively under cold ambient conditions or other conditions, the controller 320 may close the auxiliary compressor line valve 296 and the compressed air injection valve 310 to the compressed air line 300 such that the flow of hot compressed air 220 may flow from the compressor discharge manifold 230 to the inlet bleed heat system 200. The hot compressed air 220 may assist in anti-icing at the inlet of compressor 15 or elsewhere along the inlet air system 110.

The power augmentation system 100 thus may boost overall gas turbine output under hot ambient conditions with or without the use of the water cooling system 180 and the like. Moreover, use of the power augmentation system 100 may be less expensive than the water cooling system 180. Given the use of the inlet bleed heat system 200 for the flow of the auxiliary compressed air 275, the power augmentation system 100 may be easily integrated with existing gas turbine engines. Further, the compressed air injection system 260 does not increase the overall pressure drop so as to maintain overall efficiency. The power augmentation system 100 thus improves overall gas turbine output, particularly in hot ambient conditions, with reduced costs and a reduced impact on existing gas turbine components and operations.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A power augmentation system for use with a gas turbine engine under hot ambient condition or when power augmentation is desired or under cold ambient conditions or when inlet bled heat is desired, comprising:
   a compressor discharge manifold;
   an inlet bleed heat system;
   the inlet bleed heat system in communication with the compressor discharge manifold via an inlet bleed heat line;
   an auxiliary compressor;
   the auxiliary compressor in communication with the compressor discharge manifold via the inlet bleed heat line;
   a flow of auxiliary compressed air from the auxiliary compressor to the compressor discharge manifold via the inlet bleed heat line under hot ambient condition or when power augmentation is desired; and
   a flow of hot compressed air from the compressor discharge manifold to the inlet bleed heat system via the inlet bleed heat line under cold ambient conditions or when inlet bled heat is desired.

2. The power augmentation system of claim 1, wherein the compressor discharge manifold discharges the flow of hot compressed air.

3. The power augmentation system of claim 2, wherein the auxiliary compressor discharges the flow of auxiliary compressed air.

4. The power augmentation system of claim 3, further comprising a compressed air injection valve on the inlet bleed heat line such that the flow of hot compressed air flows to the inlet bleed heat system or the flow of auxiliary compressed air flows to the compressor discharge manifold.

5. The power augmentation system of claim 4, wherein the auxiliary compressor is in communication with the compressed air injection valve via a compressed air line.

6. The power augmentation system of claim 4, wherein the compressed air injection valve is communication with a controller.

7. The power augmentation system of claim 6, wherein the controller is in communication with a temperature sensor.

8. The power augmentation system of claim 1, wherein the auxiliary compressor comprises a supercharging compressor.

9. The power augmentation system of claim 1, wherein the auxiliary compressor is positioned on an auxiliary compressor skid.

10. The power augmentation system of claim 1, further comprising one or more air extractions lines in communication with the compressor discharge manifold.

11. The power augmentation system of claim 1, further comprising an inlet air system positioned upstream of the compressor.

12. The power augmentation system of claim 11, wherein the inlet air system comprises a water cooling system.

13. The power augmentation system of claim 11, wherein the inlet air system comprises an enlarged inlet filter house with a plurality of filters therein.

14. The power augmentation system 11, wherein the inlet bleed heat system comprises a plurality of heater tubes positioned within the inlet air system.

15. A method of augmenting power in a gas turbine engine under varying ambient conditions, comprising:
    placing an auxiliary compressor in a communication with a compressor discharge manifold via an inlet bleed heat system;
    flowing auxiliary compressed air from the auxiliary compressor to the compressor discharge manifold under hot ambient condition or when power augmentation is desired; and
    flowing hot compressed air from the compressor discharge manifold to the inlet bleed heat system under cold ambient conditions or when inlet bled heat is desired.

16. A power augmentation system for use with a gas turbine engine under hot ambient condition or when power augmentation is desired or under cold ambient conditions or when inlet bled heat is desired, comprising:
    a compressor discharge manifold;
    the compressor discharge manifold discharging a flow of hot compressed air;
    an inlet bleed heat system;
    the inlet bleed heat system in communication with the compressor discharge manifold via an inlet bleed heat line;
    an auxiliary compressor;
    the auxiliary compressor discharging a flow of auxiliary compressed air;
    the auxiliary compressor in communication with the compressor discharge manifold via the inlet bleed heat line;
    a compressed air injection valve on the inlet bleed heat line;
    the flow of auxiliary compressed air going from the auxiliary compressor to the compressor discharge manifold via the inlet bleed heat line under hot ambient condition or when power augmentation is desired; and
    the flow of hot compressed air from the compressor discharge manifold to the inlet bleed heat system via the inlet bleed heat line under cold ambient conditions or when inlet bled heat is desired.

17. The power augmentation system of claim 16, wherein the compressed air injection valve is communication with a controller such that the flow of hot compressed air flows to the inlet bleed heat system or the flow of auxiliary compressed air flows to the compressor discharge manifold.

18. The power augmentation system of claim 17, wherein the controller is in communication with a temperature sensor.

19. The power augmentation system of claim 16, further comprising an inlet air system positioned upstream of the compressor.

20. The power augmentation system of claim 16, further comprising a water cooling system positioned upstream of the compressor.

* * * * *